(12) United States Patent
Ramirez Ruiz

(10) Patent No.: US 12,703,441 B2
(45) Date of Patent: Aug. 11, 2026

(54) ROAD VEHICLE WITH VARIABLE GEOMETRY AILERON

(71) Applicant: FERRARI S.P.A., Modena (IT)

(72) Inventor: Isabel Ramirez Ruiz, Modena (IT)

(73) Assignee: FERRARI S.P.A., Modena (IT)

( * ) Notice: Subject to any disclaimer, the term of this patent is extended or adjusted under 35 U.S.C. 154(b) by 262 days.

(21) Appl. No.: 18/752,215

(22) Filed: Jun. 24, 2024

(65) Prior Publication Data

US 2025/0002097 A1 Jan. 2, 2025

(30) Foreign Application Priority Data

Jun. 30, 2023 (IT) ........................ 102023000013620

(51) Int. Cl.
*B62D 35/00* (2006.01)

(52) U.S. Cl.
CPC .................................. *B62D 35/007* (2013.01)

(58) Field of Classification Search
CPC .. B62D 35/007; B62D 37/02; B64C 2009/005
USPC .......................................................... 296/180
See application file for complete search history.

(56) References Cited

U.S. PATENT DOCUMENTS 9,403,564 B1 * 8/2016 Al-Huwaider ......... B60G 99/00
11,267,520 B2 3/2022 Vollertsen
2017/0355403 A1 12/2017 Grebel
2022/0371669 A1 * 11/2022 Rosok .................. B62D 35/007

FOREIGN PATENT DOCUMENTS

CN 112519900 A 3/2021
WO 2019145002 A1 8/2019

OTHER PUBLICATIONS

Italian Search Report in IT Application No. 202300013620, mailed Jan. 17, 2024, an English Translation attached hereto (14 pages).

* cited by examiner

*Primary Examiner* — Amy R Weisberg
*Assistant Examiner* — Alma D. Schuster
(74) *Attorney, Agent, or Firm* — Leason Ellis LLP

(57) ABSTRACT

A road vehicle having a roll axis, a pitch axis and a yaw axis and comprising a rear aileron; characterized in that the rear aileron comprises two airfoils coupled to each other in a rotary manner around a pivoting pin with an axis parallel to the yaw axis so that the aileron can assume a variable geometry between an opening configuration, in which the airfoils are in series to each other along an axis parallel to the pitch axis, and a closing configuration, in which the airfoils are in parallel to each other along an axis parallel to the roll axis, going through a plurality of semi-opening configurations, in which the airfoils define a non-zero negative sweep angle toward the front portion of the vehicle.

10 Claims, 4 Drawing Sheets

Y
X
1
3
4

3
2
1
3
3

4
2
1
3
4

2
3

ROAD VEHICLE WITH VARIABLE GEOMETRY AILERON

CROSS-REFERENCE TO RELATED APPLICATIONS

This patent application claims priority from Italian patent application no. 102023000013620 filed on Jun. 30, 2023, the entire disclosure of which is incorporated herein by reference.

TECHNICAL FIELD

The technical field of reference of the invention is that relating to road vehicles, in particular road vehicles of the sports type. More in detail, the invention relates to a road vehicle with a rear aileron with variable geometry. In this context, the invention will address the problem of how to improve the dynamic behaviour of the cornering vehicle by providing the rear aileron with innovative features.

PRIOR ART

As indicated in the previous chapter, the invention preferably relates to a road vehicle of the sports type. The fundamental components that make up a road vehicle are well known to a skilled person working in this technical field. It is also known to a person skilled in the art that the ability to exchange forces between the vehicle's tyres and the ground (the so-called "grip") is a function of the vertical load that pushes the tyres towards the ground. In particular, as the aforementioned vertical load increases, the capacity of the tyre to generate reaction forces on the ground increases. Greater reaction stresses on the ground result in greater traction (stresses along the longitudinal or travel direction) and greater cornering force (stresses along the transverse direction, namely orthogonal to the longitudinal direction). In order to increase the vertical load, it is known to provide for the presence of shaped portions of the frame (known as spoilers) or elements connected to the frame (ailerons) equipped with airfoils capable of generating a downward thrust as a function of the travel speed. Finally, it is known that, in a straight line, the vertical load is even on the wheels of the vehicle, whereas, along a bend, the vertical load spontaneously is not even between the inner and outer wheels. In particular, when driving along bends, the load decreases on the inner wheels and, therefore, as described above, when cornering, the inner wheels offer less ability to exchange forces with the ground, thus offering less traction at the exit of the bend and less cornering force.

In order to limit the transfer of load from the inner to the outer wheels while driving along a bend, some solutions are currently known. A first known solution involves the presence of suspensions defined as "active", namely capable of modifying their characteristics to control the distribution of the vertical load along bends. A second known solution involves the presence of anti-roll bars as passive devices, which adapt the transfer of the lateral load as a function of the vertical displacement difference of the right and left wheels of the vehicle.

DESCRIPTION OF THE INVENTION

Starting from what has been described above, the object of the invention is to offer a new and inventive solution to the problem of how to limit the transfer of load, when cornering, from the inner to the outer wheels without compromising the performances of the vehicle when in other conditions and which can be an alternative or aid to the aforementioned known active and/or passive solutions.

Therefore, the starting point of the invention is a road vehicle comprising a rear aileron. A person skilled in the art knows the elements that form a road vehicle, what a rear aileron is and the fact that the vehicle has three axes incident in the centre of gravity, namely a roll axis along the longitudinal direction of travel parallel to the ground plane, a yaw axis orthogonal to the ground plane (which, hence, when the vehicle is on a horizontal ground, is parallel to the force of gravity) and a pitch axis orthogonal to the plane defined by the two previous axes. The rear aileron comprises two airfoils connected to each other and which develop on opposite sides with respect to the longitudinal symmetry plane of the vehicle defined by the roll and yaw axes. According to the main aspect of the invention, the two airfoils are coupled to each other in a rotary manner around a pivoting pin with an axis parallel to the yaw axis between a first position, in which they are in series to each other along an axis parallel to the pitch axis (open configuration, similar to traditional fixed ailerons), and a second position, in which they are parallel to each other along an axis parallel to the roll axis in mutual lateral contact along the longitudinal plane of the vehicle defined by the roll and yaw axes (configuration in which no downward force is generated). The rotation from the series opening configuration to the parallel closing configuration takes place by moving the outer edges of the airfoils towards the front portion of the vehicle, thus progressively increasing the negative sweep angle of the aileron. This ability of the aileron to assume different sweep angles, namely the ability to shift from a zero sweep angle to a non-zero sweep angle towards the front of the vehicle (negative sweep) up to the configuration with parallel airfoils, is advantageous because it optimizes the dynamics of the vehicle in different conditions. In particular, when cornering, a non-zero negative sweep angle (semi-open aileron) is advantageous because it avoids or limits the transfer of load from the inner wheels to the outer ones. The other two conditions with airfoils in series (open aileron) or in parallel (closed aileron) respectively optimize (for example) entering a bend with a high vertical force and driving in a straight line (or at rest) with a lower aerodynamic resistance.

Preferably, the two airfoils are shaped in such a way that, when they are in series, they define a single seamless airfoil.

Preferably, the pivoting pin of the airfoils is arranged at the inner contact point of the front edges of the airfoils.

Preferably, the pivoting pin of the airfoils is movable along an axis parallel to the roll axis so that, in the closing condition, the aileron does not protrude rearwards with respect to the vehicle and, in the opening condition, it is substantially flush with the rear edge of the vehicle.

Preferably, the two airfoils have a ratio between the chord at the end and at the root of about 1.2.

Preferably, the two airfoils have a dihedral angle ranging from +2° to +100 upwards.

Preferably, the two airfoils can rotate around the pivoting pin independently of one another to assume different sweep angles.

Preferably, the two airfoils can rotate around the pivoting pin in a mutually coordinated and symmetrical manner with respect to the plane defined by the roll axis and yaw axis, for example by means of one single electric actuator.

Preferably, the two airfoils (at least when they are in series to each other) can also rotate around an axis that is parallel to the pitch axis.

BRIEF DESCRIPTION OF THE DRAWINGS

Hereinafter, an embodiment of the invention will be described, in order to allow the latter to be better understood, by way of non-limiting example and with reference to the accompanying drawings, wherein.

EMBODIMENTS OF THE INVENTION

Figure 1:
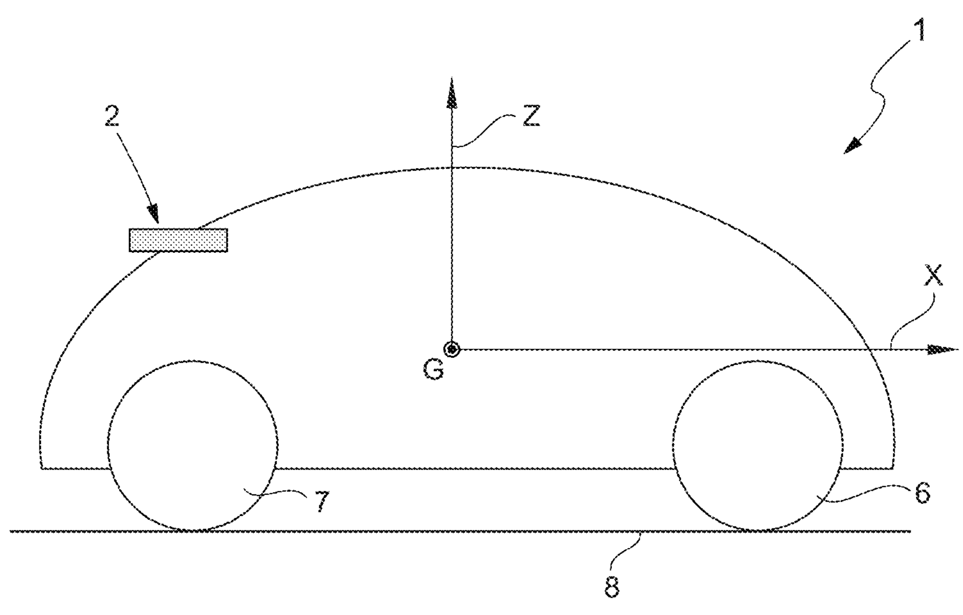
FIGS. 1 and 2 are schematic views, a side view and a top view, respectively, of a road vehicle with a rear aileron, these figures are useful to identify the reference axes of the invention.
Figure 2:
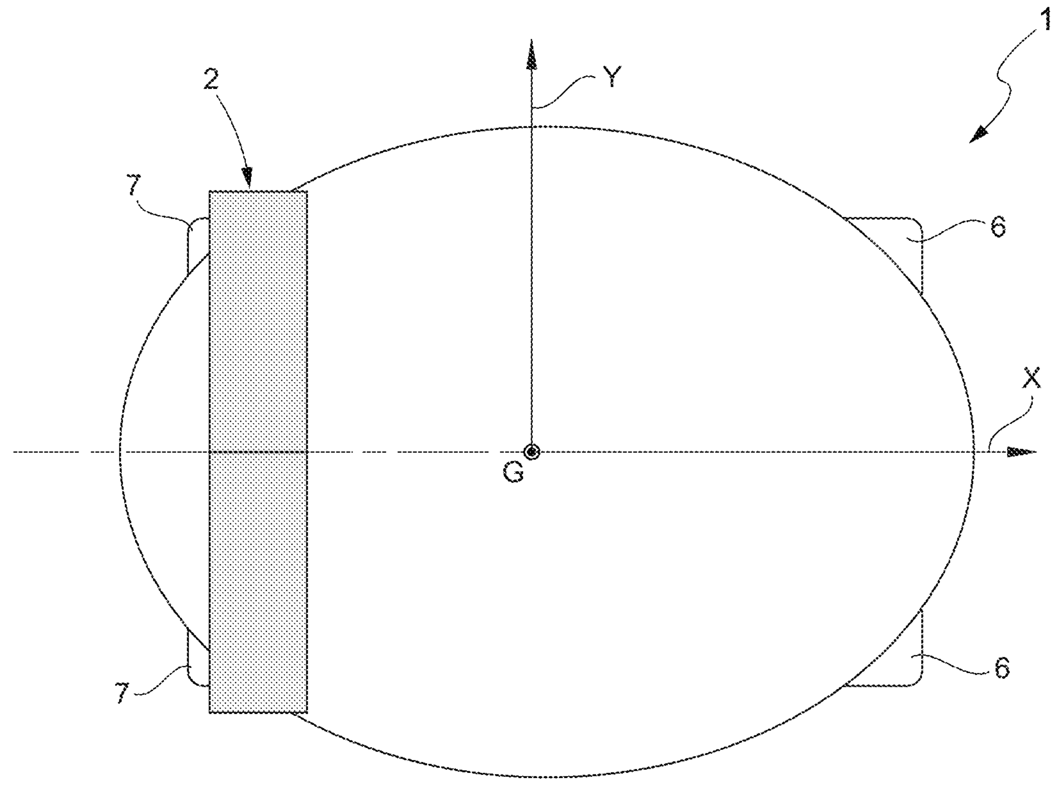
Figure 3:
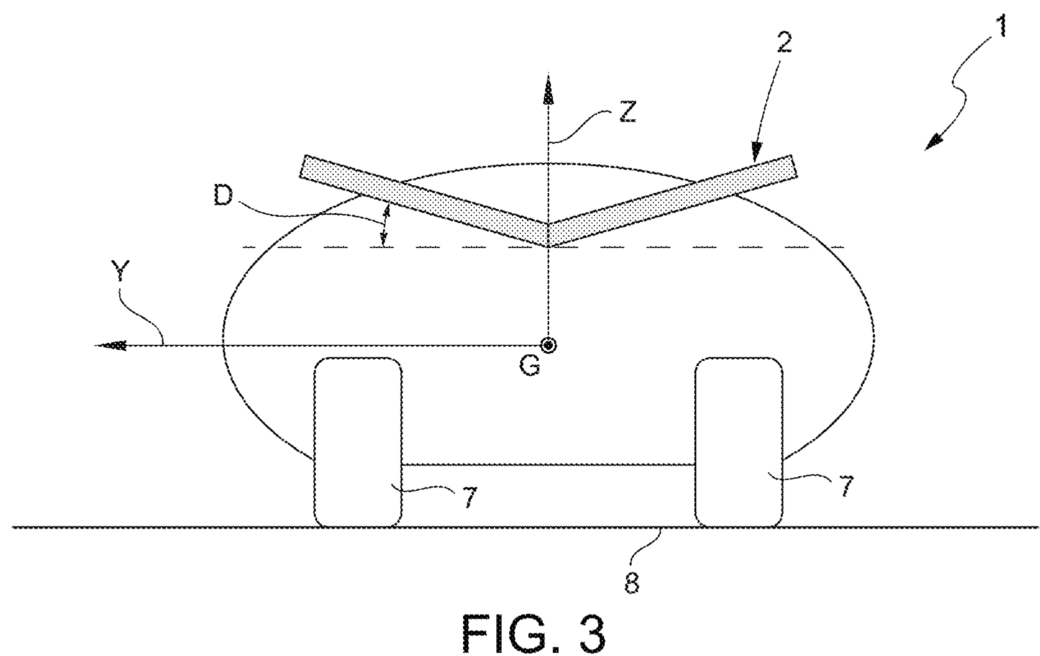
FIGS. 3 and 4 are schematic views, a rear view and a top view, respectively, of the vehicle of FIG. 1 with different rear ailerons, these figures are useful to identify reference parameters of the aileron.
Figure 4:
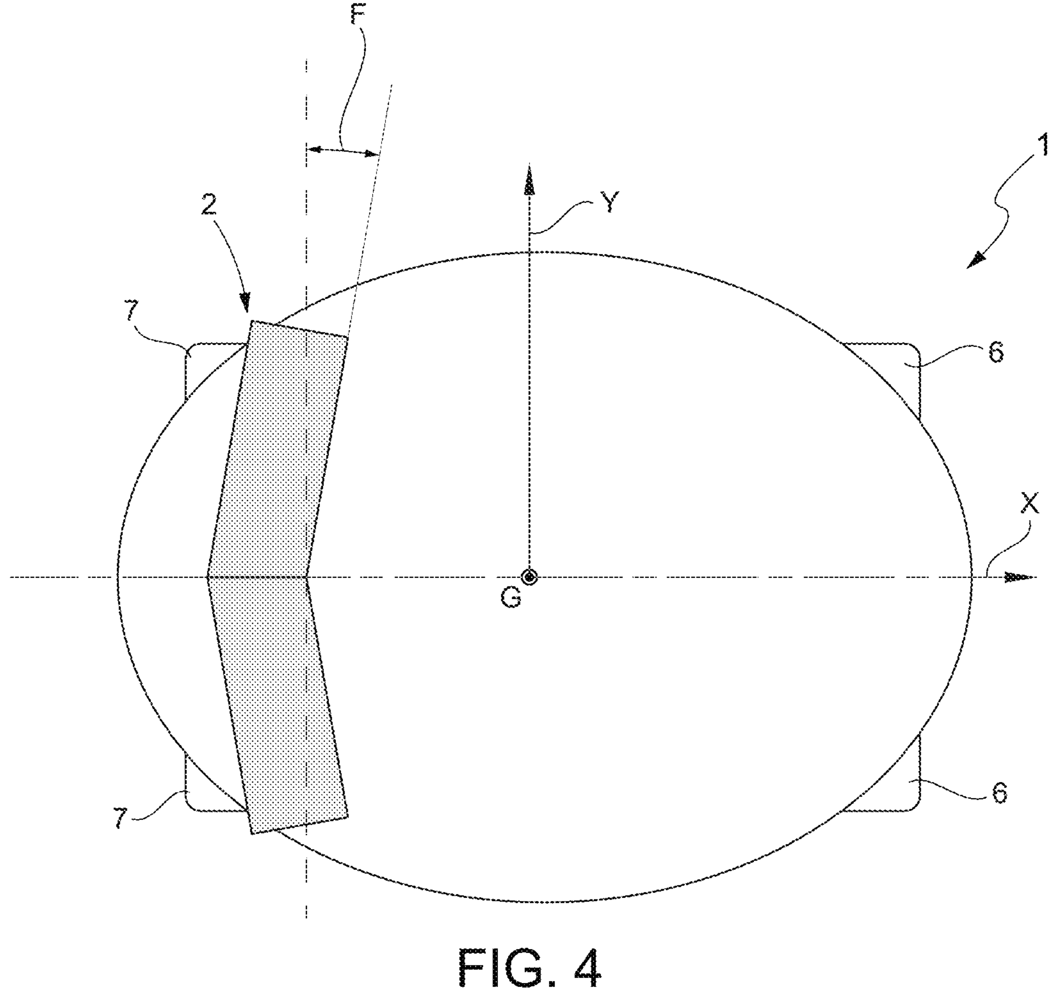

With reference to FIGS. 1 and 2, these figures are schematic views, a side view and a top view, respectively, of a road vehicle. In these figures, reference number 1 is used to indicate the motor vehicle as a whole. As it is known, a road vehicle comprises a frame 5, front wheels 6 and rear wheels 7 provided with tyres resting on the ground 8. FIGS. 1 and 3 show the reference axes of the invention, which correspond to the axes known to the person skilled in the art that are used in the dynamic analysis of the vehicle itself. Like all road vehicles, the vehicle 1 has a travel direction parallel to the plane of the ground 8. This travel direction coincides, as it is known, with the roll axis X shown in FIG. 1. Furthermore, the vehicle 1 has a yaw axis Z orthogonal to the plane defined by the ground 8 and a pitch axis Y orthogonal to the plane defined by the roll axis X and yaw axis Z. These axes are well known to a person skilled in the art and are incident in the centre of gravity G of the vehicle 1. Hereinafter, terms such as front and rear are to be understood with reference to the travel direction. The vehicle 1 of FIGS. 1 and 2 comprises a rear aileron indicated with reference 2. The airfoil of this aileron is not important for the purposes of the invention and is therefore shown only schematically. However, as it can be imagined, some airfoils are more sensible than others for the purposes of the invention. Indeed, airfoils with high downforce are preferable to airfoils with low resistance. As shown in FIG. 2, the aileron 2 is arranged in the area of a rear portion of the vehicle 1 and substantially has (as it is known) a development along an axis parallel to the pitch axis Y. Therefore, the aileron 2 comprises two symmetrical portions on opposite sides of the plane defined by the roll axis X and yaw axis Z. FIGS. 3 and 4 show particular types of ailerons 2 to introduce some parameters used in the technical field. The first parameter is known as the dihedral angle (reference D in FIG. 3) and identifies the angle between the portions of the aileron and a plane parallel to the ground 8 going through the point of symmetry of the aileron 2. The second parameter is the sweep angle F and identifies the angle between the portions of the aileron and a plane parallel to the plane Y-Z going through the point of symmetry of the aileron 2. If the sweep angle is directed towards the rear of the vehicle 1, it is referred to as a positive sweep angle. If the sweep angle is directed towards the front of the vehicle 1, it is referred to as a negative sweep angle (which is the case of FIG. 4 attached hereto). These parameters are absolutely known to a person skilled in the art.

Figures 5, 6, 7:
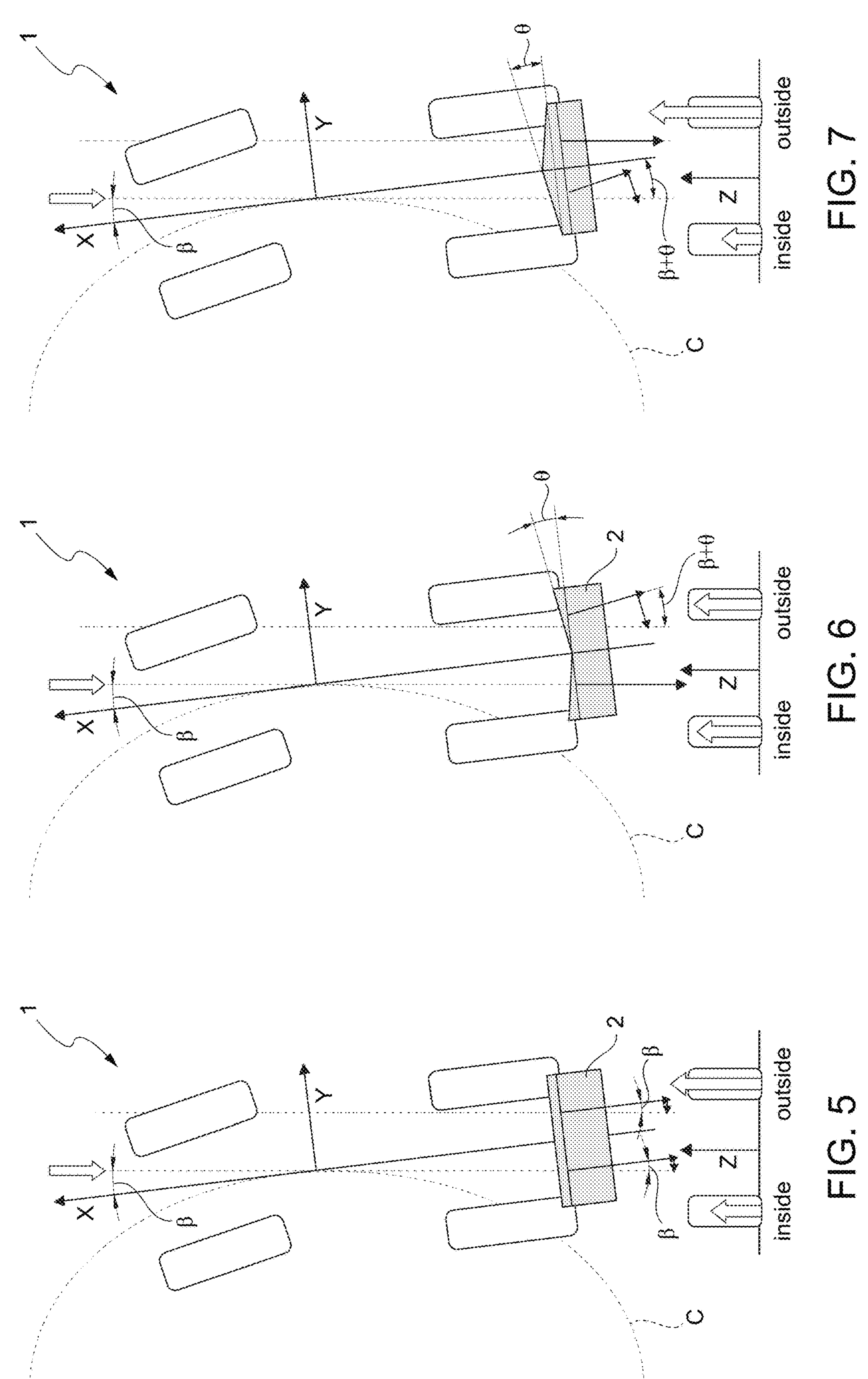
FIGS. 5-7 are schematic views of a cornering vehicle showing how the vertical load on the inner wheels varies as the geometry of the rear aileron changes.
Figures 8, 9, 10:
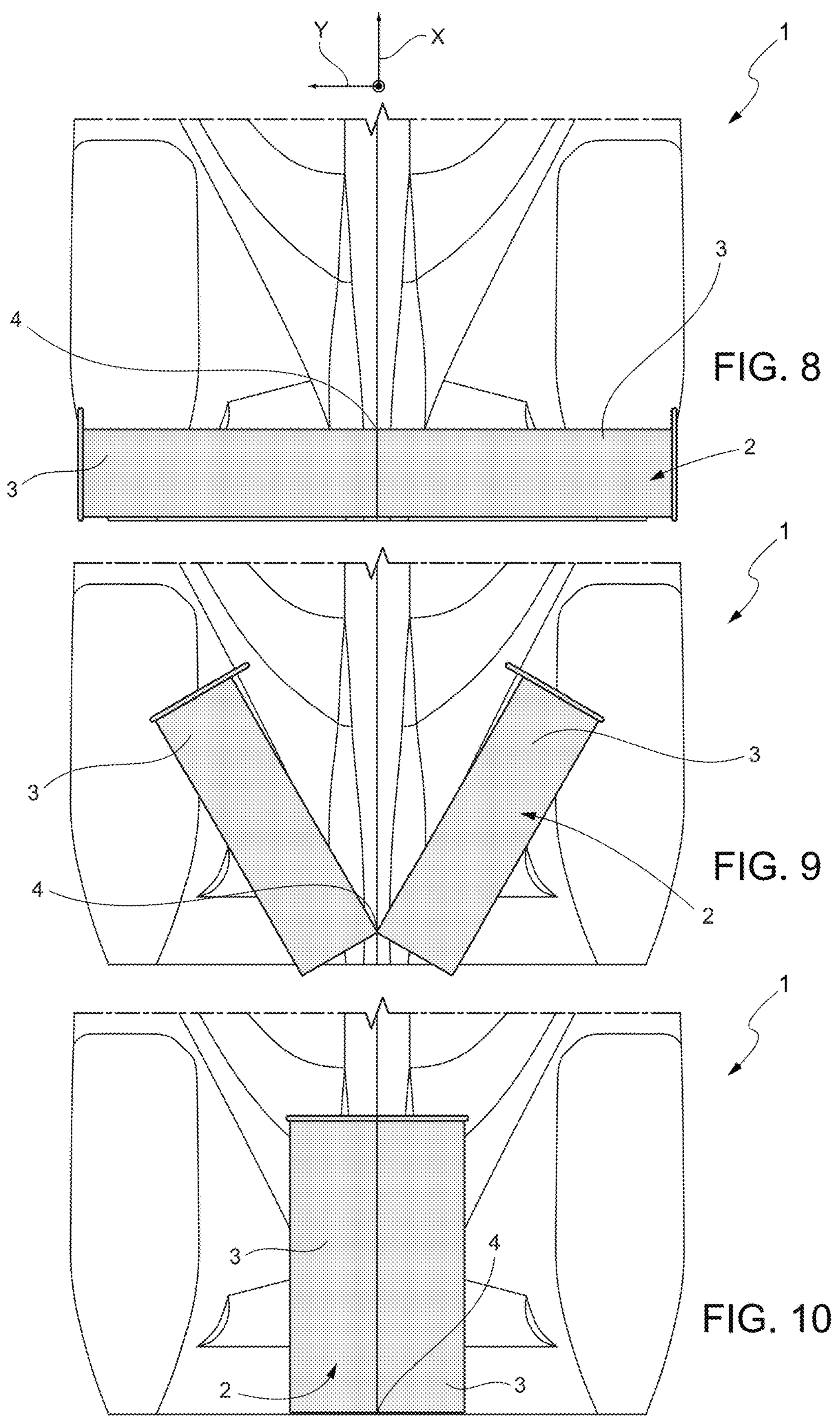
FIGS. 8-10 show a schematic example of a vehicle according to the invention, in which, in an innovative way, the rear aileron can assume different configurations according to the needs.

FIGS. 5-7 are schematic views of a vehicle driving along a bend C showing how the vertical load on the inner wheels varies as the geometry of the rear aileron used changes. In case of an aileron without sweep angle (FIG. 5), the vertical load is partly transferred from the inner to the outer wheel, with a consequent loss of grip of the inner wheel. With a negative sweep angle (FIG. 6), this load transfer from the inner to the outer wheel is limited or avoided, whereas, with a positive sweep angle (FIG. 7), the aforementioned load transfer from the inner to the outer wheel is even increased. From this comparison, it seems advantageous to provide the vehicle with a rear aileron with a negative sweep angle; however, this choice does not lead to corresponding advantages when the vehicle is travelling on non-curved stretches. FIGS. 8-10 show a vehicle according to the invention. As mentioned above, the aerodynamic aspect of the airfoil of the aileron 2 is not relevant and has therefore been represented schematically. These figures show an aileron 2 according to the invention, namely an aileron having an innovative attitude or variable geometry. In this example, the rear aileron 2 comprises two airfoils 3 (one on the right and one on the left, on the opposite sides of the plane defined by the roll axis X and the yaw axis Z), which are coupled to each other in a rotary around a pivoting pin 4 with an axis parallel to the yaw axis Z. The pivoting pin 4 and the position thereof allow the aileron 2 to assume a variable geometry between an opening configuration, in which the airfoils 3 are in series to each other along an axis parallel to the pitch axis Y (FIG. 8), and a closing configuration, in which the airfoils 3 are in parallel to each other along an axis parallel to the roll axis X (FIG. 10) in lateral contact in the area of the plane defined by the roll axis X and the yaw axis Z, going through a plurality of semi-opening configurations, in which the airfoils 3 define a non-zero negative sweep angle, i.e. directed towards the front portion of the vehicle 1 (FIG. 10). Therefore, in this example, the pivoting pin 4 is in the plane defined by the roll axis X and by the yaw axis Z at the point of contact of the front edges of the airfoils 3 and further is preferably movable along an axis parallel to the roll axis X. A single actuator is provided, preferably an electric actuator, to move the two airfoils and the pivoting pin in a coordinated manner so that they can achieve the best configuration between the closing, the opening and one of the possible semi-opening configurations according to the needs. In view of the particular and innovative variable geometry of the aileron according to the invention, this aileron can be compared to the wings of a bird, which open from a closed position according to the needs. In this sense, the aileron of the invention can also be referred to, in synthetic form, as "bird aileron" in English.

Finally, the motor vehicle 1 according to the invention can be subjected to changes and variants, which, though, do not go beyond the scope of protection set forth in the appended claims.

The invention claimed is:

1. A road vehicle (1) having a roll axis (X), a pitch axis (Y), and a yaw axis (Z) and comprising a rear aileron (2); characterized in that the rear aileron (2) comprises two airfoils (3) rotatably coupled to each other around a pivoting pin (4) with an axis parallel to the yaw axis (Z) so that the aileron (2) can assume a variable geometry between an opening configuration, in which the airfoils (3) are in series with each other along an axis parallel to the pitch axis (Y) and a closing configuration, in which the airfoils (3) are in parallel with each other along an axis parallel to the roll axis (X), passing through a plurality of semi-opening configurations in which the airfoils (3) define a non-zero negative sweep angle toward the forward portion of the vehicle (1).

2. Road vehicle (1) as claimed in claim 1, wherein the pivoting pin axis (4) is in the plane defined by the roll axis (X) and yaw axis (Z).

3. Road vehicle (1) as claimed in claim 1, wherein the two airfoils (3) are shaped in such a way that when in series define a single seamless airfoil.

4. Road vehicle (1) as claimed in claim 1, wherein the pivoting pin (4) is arranged at the contact point of the front edges of the airfoils (3).

5. Road vehicle (1) as claimed in claim 1, wherein the pivoting pin (4) is movable along an axis parallel to the roll axis (X).

6. Road vehicle (1) as claimed in claim 1, wherein the ratio of the chord at the end to the aileron root (2) is about 1.2.

7. Road vehicle (1) as claimed in claim 1, wherein the dihedral angle of the aileron (2) is between +2° and +10°.

8. Road vehicle (1) as claimed in claim 1, wherein two airfoils (3) are rotated around the pivoting pin (4) independently of each other.

9. Road vehicle (1) as claimed in claim 1, wherein two airfoils (3) are rotated around the pivoting pin (4) in a mutually coordinated and symmetrical manner with respect to the plane defined by the roll axis (X) and yaw axis (Z).

10. Road vehicle (1) as claimed in claim 1, wherein, when the two airfoils are in parallel, the two airfoils are rotatable in a mutually coordinated manner about an axis parallel to the pitch axis (Y).

* * * * *